United States Patent
Garrett et al.

(10) Patent No.: US 10,396,874 B1
(45) Date of Patent: Aug. 27, 2019

(54) PROACTIVE BEAMFORMING WHILE IN MOTION

(71) Applicant: AVAGO TECHNOLOGIES INTERNATIONAL SALES PTE. LIMITED, Singapore (SG)

(72) Inventors: David Christopher Garrett, Tustin, CA (US); Nicholas Ilyadis, Merrimack, NH (US); Alireza Tarighat Mehrabani, Irvine, CA (US); Eran Ridel, Rosh Ha'aiyn (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 63 days.

(21) Appl. No.: 15/336,727

(22) Filed: Oct. 27, 2016

Related U.S. Application Data

(60) Provisional application No. 62/327,367, filed on Apr. 25, 2016.

(51) Int. Cl.
*H04B 7/06* (2006.01)
*H04W 36/32* (2009.01)
*H04W 36/18* (2009.01)
*H04W 64/00* (2009.01)

(52) U.S. Cl.
CPC .......... *H04B 7/0617* (2013.01); *H04W 36/18* (2013.01); *H04W 36/32* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 9,955,387 | B1 * | 4/2018 | Shah | H04W 36/0055 |
| 2006/0046765 | A1 * | 3/2006 | Kogure | H04W 52/28 455/522 |
| 2009/0088156 | A1 * | 4/2009 | Aaron | H04W 36/32 455/436 |
| 2010/0020702 | A1 * | 1/2010 | Wong | H04L 41/5009 370/252 |
| 2012/0208467 | A1 * | 8/2012 | Wang | H04B 7/0404 455/42 |
| 2013/0121185 | A1 * | 5/2013 | Li | H04W 72/046 370/252 |
| 2018/0310322 | A1 * | 10/2018 | Zhang | H04L 5/0053 |
| 2018/0343659 | A1 * | 11/2018 | Hahn | H04W 28/02 |

* cited by examiner

*Primary Examiner* — Suhail Khan
(74) *Attorney, Agent, or Firm* — Morgan, Lewis & Bockius LLP

(57) ABSTRACT

A device that implements proactive beamforming while in motion may include at least one processor configured to establish communication with a first base station via a first beam. The at least one processor may be configured to monitor motion of at least one of: the device, the first base station, or a second base station. The at least one processor may be configured to determine that the device is approaching a second base station based at least in part on the monitored motion. The at least one processor may be configured to form a second beam in a direction of the second base station. The at least one processor may be configured to establish communication with the second base station via the second beam and terminate the first beam with the first base station upon establishing communication with the second base station via the second beam.

20 Claims, 8 Drawing Sheets

PROACTIVE BEAMFORMING WHILE IN MOTION

CROSS-REFERENCE TO RELATED APPLICATIONS

The present application claims the benefit of U.S. Provisional Patent Application Ser. No. 62/327,367, entitled "Proactive Beamforming while in Motion," filed on Apr. 25, 2016, which is hereby incorporated by reference in its entirety for all purposes.

TECHNICAL FIELD

The present description relates generally to beamforming, including proactive beamforming while in motion.

BACKGROUND

Millimeter wavelength (mmWave) applications in consumer electronics typically benefit from lower power and cost in exchange for lower performance (e.g., shorter range). On the other end of the spectrum, backhaul mmWave applications may have high performance requirements in terms of range and coverage but can tolerate higher power consumption and cost. For example, backhaul mmWave applications may require a large number of antenna elements, such as fifty or more antenna elements.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
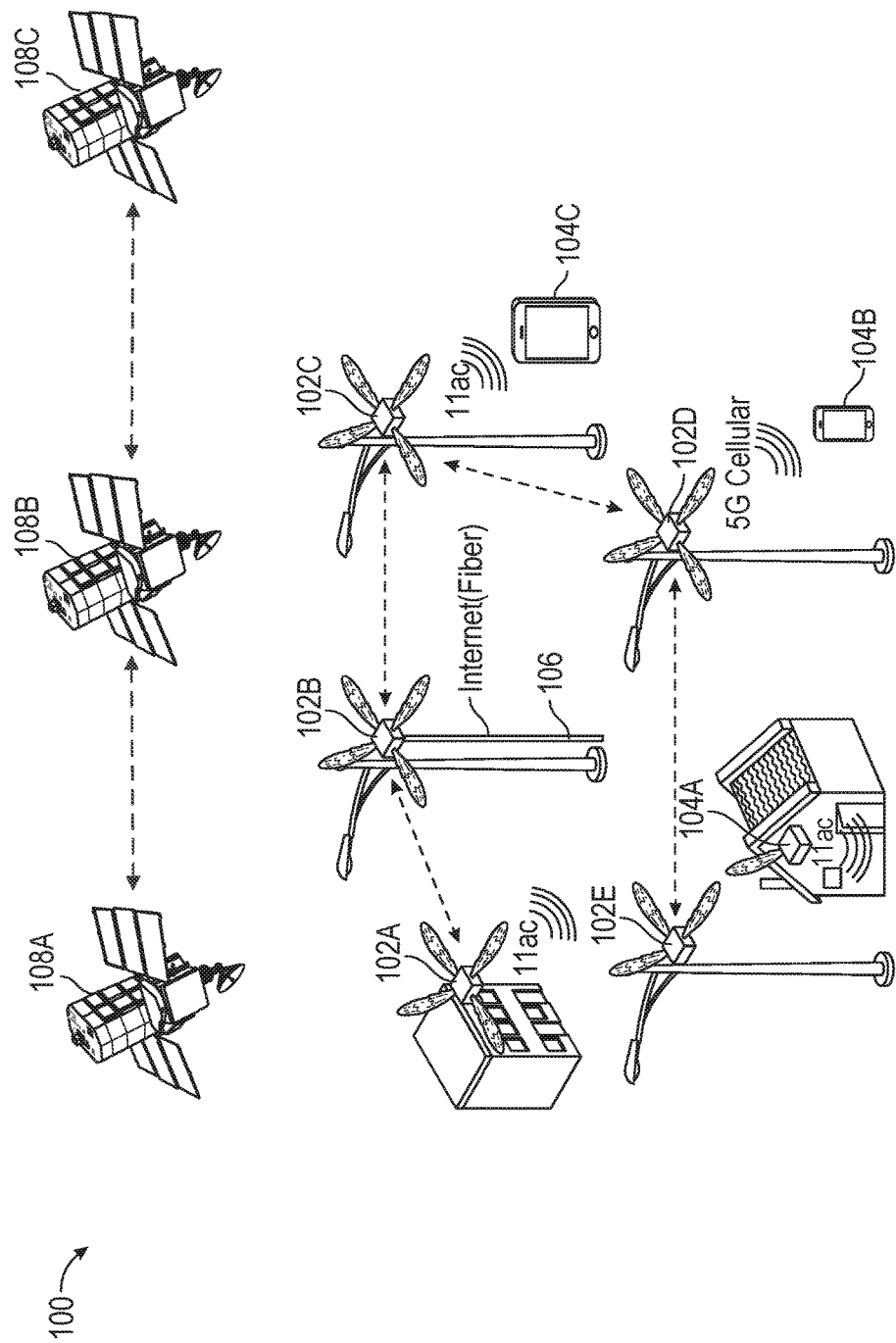
FIGS. 1 and 2 illustrate example network environments in which proactive beamforming while in motion may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Beamforming may be used by a user device to steer receive and transmit beams in the direction of a base station. For example, beamforming may allow focusing/steering of transmitted and/or received beams in a desired direction to overcome unfavorable path loss (e.g., avoid path(s) associated with higher loss). Beamforming may also be referred as beam steering or simply steering. For transmitting signals, transmit beamforming may be utilized to increase signal directivity. The increased signal directivity may allow, for example, an increase in propagation distance of a beamformed signal (e.g., relative to a signal transmitted without beamforming) and/or a reduction in signal interference with users other than an intended recipient of the beamformed signal. For receiving signals, receive beamforming may increase reception sensitivity of signals from a specific direction and reduce interfering signals by focusing signal reception in the specific direction and/or blocking signals from other directions. Different beam settings may involve, by way of non-limiting example, beams in different directions (e.g., different rotations), beams at different power levels (e.g., different amplitudes), beams using different groups of antenna elements, etc.

When the user device is in motion, the user device may need to reactively steer the beams in the direction of the base station as the user device moves. The reactive nature of the beam steering may result in suboptimal beamforming while the user device is in motion. The beamforming may be further complicated/impacted when the base station is in motion, e.g. in lieu of and/or in addition to the user device being in motion. Furthermore, as the user device moves out of the range and/or service area of the base station, the user device may be handed off to another base station. However, this reactionary handoff may result in suboptimal connectivity, e.g., while the user device is between base stations.

In the subject system, when a user device and/or base station are in motion, the user device and/or base station proactively steer, or adjust, their beams (e.g., adjust the beam setting and/or transition to another beam setting) in the direction of the expected movement of the base station and/or user device, e.g. based on one or more motion parameters associated with the movement, in order to maintain substantially optimal beams while either or both of the devices are in motion. The subject system may also be used to facilitate a handoff when the base stations and/or user device are in motion where the user device transmits a wide beam in the direction of an expected location of a target base station for handoff and progressively narrows the beam as communication with the target base station is established. Thus, the subject system may improve, for example, beamforming performance when devices are in motion by steering beams in the direction where a link partner is expected to be (e.g. rather than the last known location of the link partner), in addition to widening or narrowing the beams depending on a determined certainty (or probability) associated with the expected location of the link partner.

FIG. 1 illustrates an example network environment 100 in which proactive beamforming while in motion may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more base stations 102A-E and one or more user devices 104A-C, such as electronic devices. One or more of the base stations 102A-E, such as the base station 102B, may be coupled to a network, such as the Internet, via a transmission media 106, such as a fiber optic transmission media. In one or more implementations, the transmission media 106 may be shared by tens, hundreds, thousands, or any number of base stations 102A-E and/or nodes.

The base stations 102A-E utilize one or more wireless communication technologies, such as mmWave technologies, to communicate with one another, e.g. via backhaul communications. For example, the base stations 102A,C-E may utilize backhaul communications to access/share the network connection of the base station 102B, e.g. via the transmission media 106. The base stations 102A-E may be arranged in a star topology, a ring topology, a mesh topology, or generally any network topology through which backhaul communications may be implemented. One or more of the base stations 102A-E and/or the user devices 104A-C may include all or part of the system discussed below with respect to FIG. 8.

The base stations 102A-E also communicate with one or more of the user devices 104A-C using one or more wireless communication technologies, such as Wi-Fi (802.11ac, 802.11ad, etc.), cellular (3G, 4G, 5G, etc.). For example, the base stations 102A,C may communicate with one or more of the user devices 104A-C using 802.11ac communications, while the base station 102D may communicate with one or more of the user devices 104A-C using 5G cellular communications. In one or more implementations, the base stations 102A-E may have a small form factor, such as five inches by five inches by five inches (height by width by depth), and may be mounted, for example, on telephone poles and/or other municipal infrastructure. Thus, the base stations 102A-E may be used to provide low-cost municipal Wi-Fi, e.g. nodes utilizing 802.11ac technology and/or communicating over unlicensed bands, for providing 4G/5G small cell backhauling, and/or for providing broadband and fiber to homes and/or dwelling units, e.g. to cover the last mile through multiple hops to provide, e.g. gigabit speeds to homes and/or dwelling units.

In one or more implementations, the base stations 102A-E may be attached to, and/or included in, an airborne object, such as a hot air balloon, a drone airplane, a satellite, and the like. For example, there may be one or more satellites 108A-C, such as hundreds of satellites, in orbit over the earth that each has a base station attached, and/or included. One or more base stations of one or more of the satellites 108A-C may communicate utilizing backhaul communications, e.g. via mmWave, and one or more base stations of one or more satellite 108A-C may also communicate with one or more user devices, such as receiver devices, on earth, such as via spot beams. In one or more implementations, one or more of the base stations of one or more of the satellites 108A-C may communicate with one or more of the base stations 102A-E on earth, such as using spot beams.

Thus, one or more of the base stations 102A-E may be in motion, such as constant or near-constant motion. Furthermore, in the case of one or more base stations 102A-E included in or attached to one or more of the satellites 108A-C in orbit, the motion may be consistent in the sense that an expected location of the base stations 102A-E at any given time can be accurately predicted. Similarly, when one or more of the base stations 102A-E are included in or attached to a drone airplane, the movement of the one or more base stations 102A-E may be consistent in the sense that the flight plan of the drone airplane may be pre-established and generally fixed. One or more of the base stations 102A-E and/or the user devices 104A-C may include all or part of the system discussed below with respect to FIG. 10.

In one or more implementations, the smaller wavelengths associated with mmWave frequencies may facilitate use of a large number of antenna elements in a small form factor to generate highly directional beams. The large number of antenna elements may facilitate focusing of signals (e.g., for transmitting or receiving) in different directions through different subsets of the antenna elements. In one or more implementations, one or more transmissions and/or one or more receptions may occur simultaneously when the transmission(s) and/or reception(s) do not utilize overlapping antenna element(s).

In order to provide high throughput backhaul communications, e.g. using mmWave communications, the base stations 102A-E may include a large number of antenna elements, such as tens, hundreds, thousands, or any number of antenna elements, to implement directional beamforming. Since the user devices 104A-C may not provide high throughput backhaul communications, the user devices 104A-C may utilize a lesser number of antenna elements than the base stations 102A-E. In one or more implementations, the user devices 104A-C may be, and/or may include, satellite receiver devices, and may include and/or be communicatively coupled to a large number of antenna elements.

In one or more implementations, beam training may be utilized by a transmitter and a receiver to find one or more beams (e.g., one or more beam settings) for use in communications between the transmitter and the receiver, e.g. while one or both of the transmitter and receiver are in motion. The base stations 102A-E and/or the user devices 104A-C may each be operable as the transmitter and/or the receiver. In some cases, the base stations 102A-E and/or the user devices 104A-C may concurrently transmit signals while receiving signals (e.g., operate concurrently as a transmitter and a receiver). The beam settings may include settings for the phase shifters, settings for the amplifiers, and/or settings for which antenna elements to use for receiving or transmitting, etc., to produce the beams that allow high quality communication between the transmitter (e.g., the base station 102A) and the receiver (e.g., the user device 104A). High quality communication may be associated with, for example, higher signal-to-noise ratio (SNR).

The beam training may include performing, by the transmitter and/or the receiver, a channel estimation operation(s) to estimate a communication channel (e.g., a wireless communication channel) between the transmitter and the receiver. In some cases, the beam training may take into consideration the base stations and/or the user devices that may be concurrently supported by the transmitter and the receiver. For example, the beam setting utilized by the transmitter to form and transmit a beam to the receiver may be different when the transmitter transmits a beam only to the receiver compared to when the transmitter simultaneously transmits a beam to the receiver and one or more beams to one or more other receivers. Furthermore, the beam training may implement the subject system when the transmitter and/or receiver are in motion.

The beam training may be utilized to find multiple candidate beams, such that when a beam utilized for communication and originally associated with a highest quality decreases in quality, the transmitter may transition to another beam and utilize the other beam for communication. The quality of communication associated with a beam may change when the receiver has moved and/or the channel has changed (e.g., an obstruction has been introduced in the channel between the transmitter and the receiver). In some cases, the receiver may be listening for beams in an omni-directional manner, such that beams of different beam settings (e.g., from the transmitter) may be sensed. After receiving the beams, the receiver may provide feedback to the transmitter indicating which of the beam settings are associated with higher quality beams. The beam settings of the candidate beams may be stored by the transmitter and/or the receiver.

In the subject system, when a base station 102A and/or a user device 104A are in motion, the base station 102A and/or the user device 104A proactively steers, or adjusts, their beams (e.g., adjust the beam setting and/or transition to another beam setting) in the direction of the expected movement of the base station 102A and/or the user device 104A, e.g. based on one or more motion parameters associated with the movement, in order to maintain substantially optimal beams in the direction of the base station while in motion. The motion parameters may include the location (e.g., start and/or end location), velocity, direction, orientation, and/or acceleration associated with the movement.

The base station 102A and/or the user device 104A may include a location module that provides information regarding the location and/or movement (e.g., velocity, acceleration) of the base station 102A or the user device 104A, respectively, and/or an orientation module that provides information regarding the orientation of the base station 102A or the user device 104A. The orientation may include, by way of non-limiting example, orientation (e.g., angular orientation) of one or more antennas of the user device 104A relative to the base station 102A, and/or vice-versa, and rate of angular change in the orientation. The user device 104A may also include, and/or have access to, location and/or orientation information corresponding to the base station 102A and one or more proximal base stations 102B-E. For instance, the location and/or orientation information may be transmitted from the base station 102A and one or more proximal base stations 102B-E to the user device 104A, and/or the user device 104A may obtain location information and/or expected location information, such as for a satellite or a drone airplane, from a server.

Accordingly, based on the location and/or movement information provided by, e.g., the location module of the user device 104A and/or the location information for the base station 102A, the user device 104A can proactively steer its beams towards the base station 102A while the user device 104A is in motion. Alternatively, and/or in addition, the user device 104A may provide its location and/or movement information to the base station 102A and/or another device, such as a server, and the base station 102A, and/or other device, may signal control information, e.g. weights, that can be used by the user device 104A to proactively steer and/or adjust its beams in the direction of the base station 102A while either or both of the base station 102A and the user device 104A are in motion.

In the instance where one or more of the base stations 102A-E are in motion, the base stations 102A-E may also track their own location and/or movement (including velocity, acceleration, direction, orientation, etc.), such as in addition to tracking (and/or receiving) location and/or movement information for the user device 104A. The base station 102A may then determine, e.g. based on its own location and/or movement, and the location and/or movement, of the user device 104A and/or other base stations 102B-E (e.g. for backhaul), optimal control information for continuously steering the beams of the user device 104A (and/or its own beams) in the direction of the base station 102A while one or both are in motion. The base stations 102A-E and the user devices 104A-C may communicate location information, movement information, and/or control information via an in-band and/or out of band control channel. For example, in a 5G implementation, the devices may utilize one or more 4G channels as a control channel.

Figure 2:
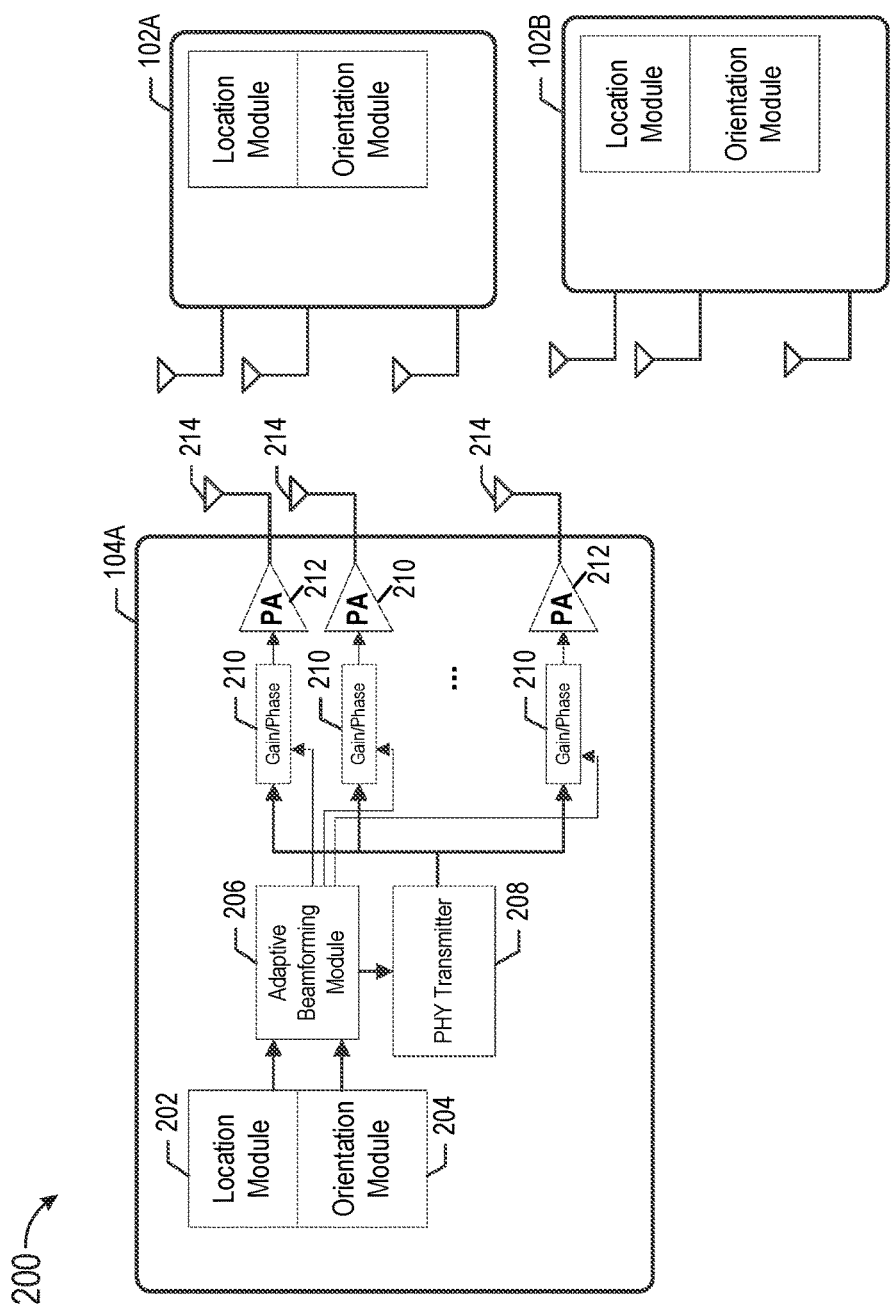

FIG. 2 illustrates an example network environment 200 in which proactive beamforming while in motion may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the example network environment 200 includes the base stations 102A-B and user device 104A of FIG. 1. However, alternatively or in addition, the network environment 200 may include other base stations and/or user devices. In some cases, the number of user devices in the network environment 200 may be larger than the number of base stations.

The user device 104A includes a location module 202 that provides information regarding the location and/or movement (e.g., velocity, acceleration) of the user device 104A and an orientation module 204 that provides information regarding the orientation of the user device 104A, e.g. orientation of one or more antennas of the user device 104A relative to the base stations 102A-B. In some cases, the location module 202 and/or the orientation module 204 may provide information indicative an uncertainty associated with their respective information (e.g., location/movement for the location module 202, orientation for orientation module 204). For instance, when the user device 104A is traveling at a certain speed, a coordinate x, y, z signifying a location of the user device 104A may in actuality fall anywhere within the range x±10%, y±10%, z±10%, respectively.

The uncertainty may be a function of the movement (e.g., linear speed, angular speed, etc.). The uncertainty associated with the location, movement, and/or orientation information of the user device 104A may be determined based on, for example, feedback (e.g., power measurements) from one or more of the base stations 102A-B and/or knowledge of the limitations associated with components (e.g., gyros, accelerometers) in the location module 202 and/or the orientation module 204 of the user device 104A. In some cases, the location module 202 and/or the orientation module 204 may generate a prediction (e.g., projection) of motion parameters (e.g., the location/movement and orientation information, respectively), e.g. 10 milliseconds or 1 microsecond in the future. The prediction may take into account the uncertainty associated with the motion parameters (e.g., the location/movement and orientation information).

The user device 104A includes an adaptive beamforming module 206 that determines a beam setting (e.g., beam power, beam direction) to be utilized and a physical layer (PHY) transmitter 208 that generates a beam based on the beam setting. The beam setting may be determined based at least on information from the location module 202 and/or orientation module 204 (e.g., location information and associated uncertainty and prediction). The generated beam is transmitted to gain/phase blocks 210 that apply gain and/or phase shift to the beam. The gain applied to a signal may be an amplification of the signal or an attenuation of the signal (e.g., negative gain). The gain and/or phase shift applied to by one gain/phase block can be the same or can be different from the gain and/or phase shift applied by another gain/phase block, as appropriate to implement directional beamforming.

An output of each gain/phase block 210 is coupled to an antenna element 214 via a power amplifier (PA) 212. An output of the antenna elements 214 form an output beam (e.g., a beamformed output signal) of the user device 104A. A respective gain and/or phase shift applied by each gain/phase block 210 may be based on the beam setting. For instance, the adaptive beamforming module 206 may generate and transmit control signals to the gain/phase blocks 210 to facilitate generation of an output beam with the determined beam setting. Although FIG. 2 illustrates a transmit path of the user device 104A, the user device 104A may also include a receive path, as described below with respect to FIG. 3.

The base stations 102A-B each includes a respective location module and a respective orientation module. The base stations 102A-B may provide location and/or orientation information to the user device 104A to cause adjustment of the beam setting by the user device 104A. In such a case, the user device 104A may adjust the beam setting to compensate for movement of the user device 104A and/or one or more of the base stations 102A-B. In some aspects, the base stations 102A and/or 102B may include an adaptive beamforming module to allow beamforming (e.g., transmit beamforming and/or receive beamforming) at the base stations 102A and/or 102B.

Figure 3:
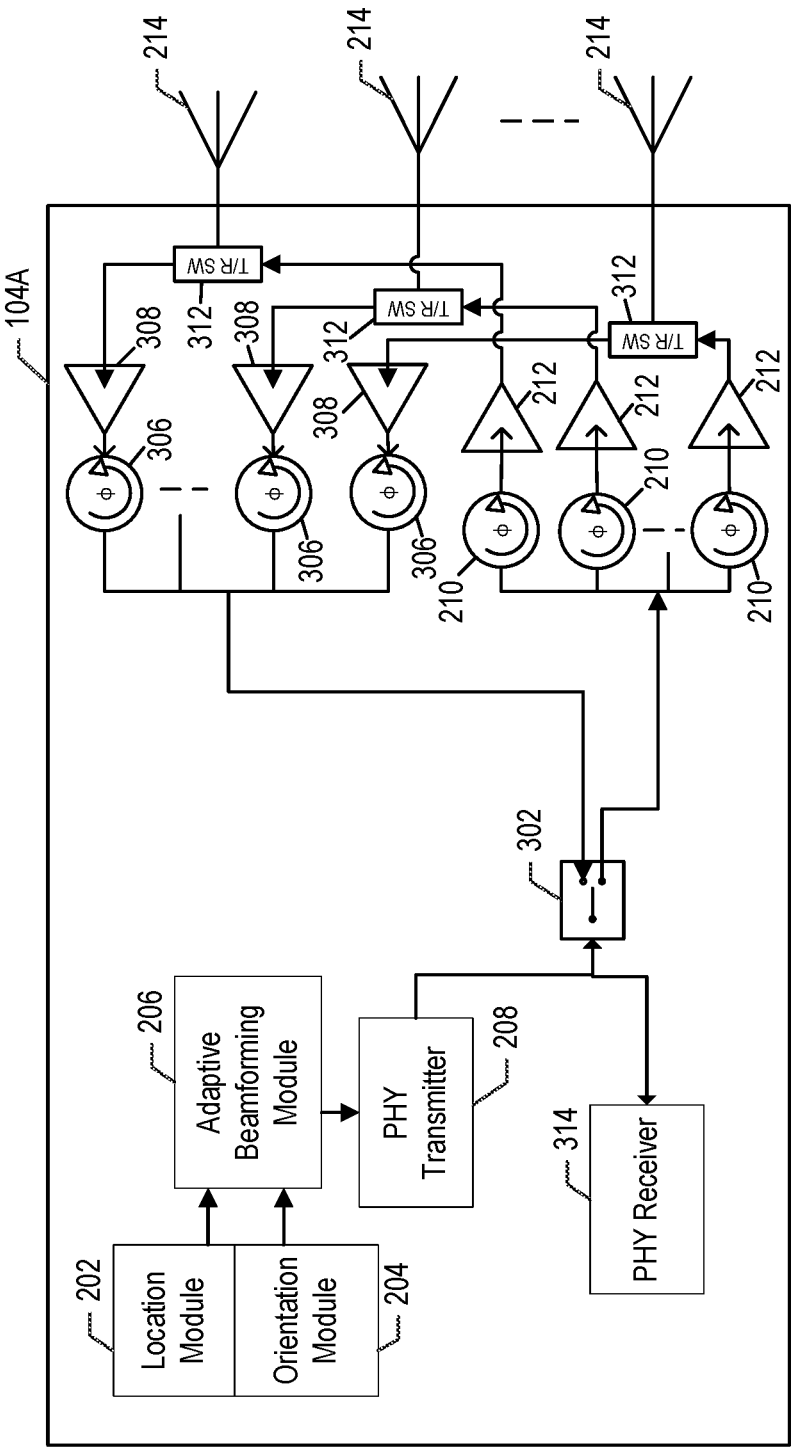
FIG. 3 illustrates an example user device that may implement proactive beamforming while in motion in accordance with one or more implementations.

FIG. 3 illustrates an example of a user device that may implement proactive beamforming while in motion in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. For explanatory purposes, the user device 104A is illustrated in FIG. 3. However, one or more of the components illustrated in FIG. 3 may also be used in the other user devices 104B-C and/or the base stations 102A-E.

In the transmit path, a signal (e.g., a radio frequency (RF) signal) is received from the PHY transmitter 208, which is passed through a switch 302. The signal is split and passed to the gain/phase blocks 210 (e.g., transmit phase shifters). The gain/phase blocks 210 may apply phase shift and/or gain to the signal, as appropriate to implement directional beamforming, and transmit the processed signal to the power amplifiers 212. The power amplifiers 212 amplify the processed signal. The amplified processed signal is transmitted through transmit/receive switches 312 and, e.g. external to the user device 104A, via the antenna elements 214.

Similarly, in the receive path, signals (e.g., RF signals) received via the antenna elements 214 pass through the transmit/receive switches 312, low noise amplifiers 308, gain/phase blocks 306 (e.g., receive phase shifters), and are combined. The combined signal is transmitted through the switch 302, e.g. for processing of the received signal via a PHY receiver 314. The gain/phase blocks 210 and 306 may receive control signals from the adaptive beamforming module 206. The PHY transmitter 208 and/or the PHY receiver 314 may receive control signals from the adaptive beamforming module 206.

In the subject system, a user device (e.g., the user device 104A) may use location and/or movement information to facilitate a handoff from a primary base station (e.g., the base station 102A) to a secondary base station (e.g., the base station 102B) using one or more secondary beams, e.g. while maintaining one or more primary beams in the direction of the primary base station. For example, the user device 104A and/or the primary base station 102A may store/track/access location and/or movement information for one or more adjacent/proximal secondary base stations 102B. Accordingly, as the user device 104A approaches a secondary base station 102B, the user device 104A may request and/or the primary base station 102A may automatically provide, channel information for the secondary base station 102B. For example, the primary base station 102A may request the channel information from the secondary base station 102B, such as over backhaul, as the user device 104A approaches the secondary base station 102B, and the primary base station 102A may forward the channel information to the user device 104A.

The user device 104A may utilize the channel information to initiate one or more beams in the direction of the secondary base station 102B. The secondary base station 102B may concurrently initiate one or more beams in the direction of the user device 104A that transmit the same information signal that is being transmitted by the primary base station 102A to the user device 104A. The user device 104A may initially initiate wide beams in the direction of the secondary base station 102B; however, as the user device 104A establishes a connection with the secondary base station 102B, the user device 104A may progressively narrow the beams to focus on the beams of the secondary base station 102B. In one or more implementations, the user device 104A may use a phased array to establish one or more beams in the direction of the secondary base station 102B concurrently with, and/or on the same frequency as, the one or more beams in the direction of the primary base station 102A. The beams may be established such that the beams in the direction of the secondary base station 102B steer nulls in the direction of the primary base station 102A, and vice versa. Once the user device 104A establishes a connection with the secondary base station 102B, the user device 104A may terminate the beams in the direction of the primary base station 102A, thereby terminating the connection with the primary base station 102A.

In one or more implementations, one or more of the switch 302, the gain/phase blocks 210 and 306, the power amplifiers 212, the transmit/receive switches 312, the low noise amplifiers 308, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4:
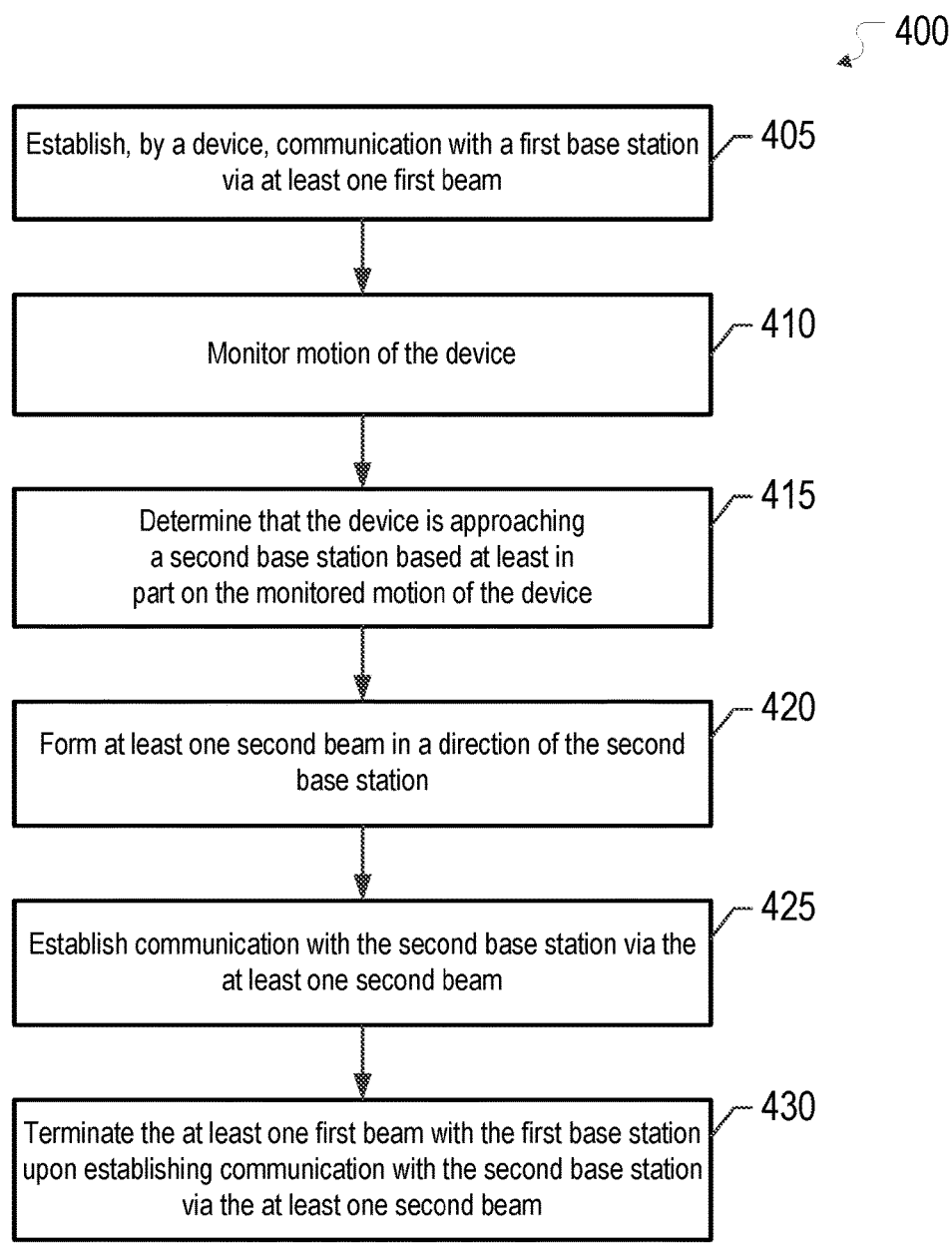
FIG. 4 illustrates a flow diagram of an example process for facilitating proactive beamforming while in motion in accordance with one or more implementations.

FIG. 4 illustrates a flow diagram of an example process 400 for facilitating proactive beamforming while in motion in accordance with one or more implementations. For explanatory purposes, the example process 400 is primarily described herein with reference to the base stations 102A-B and the user device 104A in the network environment 200 of FIG. 2. However, the example process 400 is not limited to the network environment 200, and one or more blocks (or operations) of the example process 400 may be performed by one or more components of the base stations 102A-B and/or the user device 104A. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

In the process 400, the user device 104A establishes communication with the base station 102A via a first beam (405). The first beam may be associated with a first beam setting (e.g., beam power, beam direction) utilized by the first beam to establish communication and, once communication is established, communicate with the base station 102A. The first beam setting for use in communicating with the base station 102A may be determined based on, for example, link requirements between the user device 104A and the base station 102A, location/movement of the user device 104A relative to location/movement of the base station 102A, required signal strength, and/or a combination thereof, among other criterion. In some cases, the first beam setting may be determined based on information from the location module and/or orientation module of one or both of the user device 104A and the base station 102A.

The user device 104A monitors its motion (410). The user device 104A may monitor its motion based at least on information from the location module 202 and/or orientation module 204 (e.g., of the user device 104A, base stations 102A-B, and/or other user devices and/or base stations). The user device 104A determines that it is approaching the base station 102B based at least in part on the monitored motion of the user device 104A (415). In some cases, the user device 104A and/or the base station 102A may store/track location and/or movement information for one or more adjacent/proximal base stations, e.g. including the base station 102B. As the user device 104A approaches the base station 102B, the user device 104A may request and/or the base station 102A may automatically provide, channel information for the base station 102B. For example, the base station 102A may request the channel information from the base station 102B as the user device 104A approaches the base station 102B, and the base station 102A may forward the channel information to the user device 104A. The channel information may include, for example, a frequency, a modulation and coding scheme (MCS), or generally any information that may be used to form a connection with the base station 102B.

The user device 104A forms a second beam in a direction of an expected location of the base station 102B, such as based on the movement information (420). In some cases, the user device 104A may utilize the channel information to determine a beam setting to use for communication with the base station 102B and form the second beam based on the determined beam setting. The second beam may be a transmit beam and/or a receive beam.

The user device 104A establishes communication with the base station 102B via the second beam (425). In some cases, the user device 104A may initially form wide beams in the direction of the base station 102B. As the user device 104A establishes a connection with the base station 102B, the user device 104A may narrow the beam to focus on the base station 102B. The initial, wide (transmit and/or receive) beams may be utilized to facilitate detection of the beams from the user device 104A by the base station 102B and elicit feedback from the base station 102B (e.g., power measurements, etc.). In this regard, the wider beams cover a larger range (e.g., than narrower beams) and, thus, better account for uncertainties associated with the motion parameters (e.g., location, velocity, acceleration, etc.). The narrow beams may be utilized to increase directivity of the beams and allow for higher quality communications (e.g., higher SNR) between the user device 104A and the base station 102B. The user device 104A may steer one or more nulls in the direction of the base station 102A, and/or vice versa.

Once the user device 104A establishes a connection with the base station 102B, the user device 104A terminates the first beam in the direction of the base station 102A (430), thereby terminating the connection with the base station 102B and completing handoff from the base station 102A to the base station 102B.

In traditional beamforming, beams may be narrowly focused subsequent to training. With adaptive beamforming, beamforming may be based on location, movement, and/or orientation of at least one of a transmitter or a receiver. The beamforming may also be based on the uncertainty associated with these properties. Thus, the width of the beams may change over when there is fluctuation and/or unpredictability of the motion of the user device 104A and a communicatively coupled base station, such as the base station 102A. For explanatory purposes, in the description of FIGS. 5 and 6, the user device 104A is the initial transmitter and the base station 102A is the initial receiver. In other cases, the initial transmitter and the initial receiver may both be base stations or may both be user devices.

Figure 5:
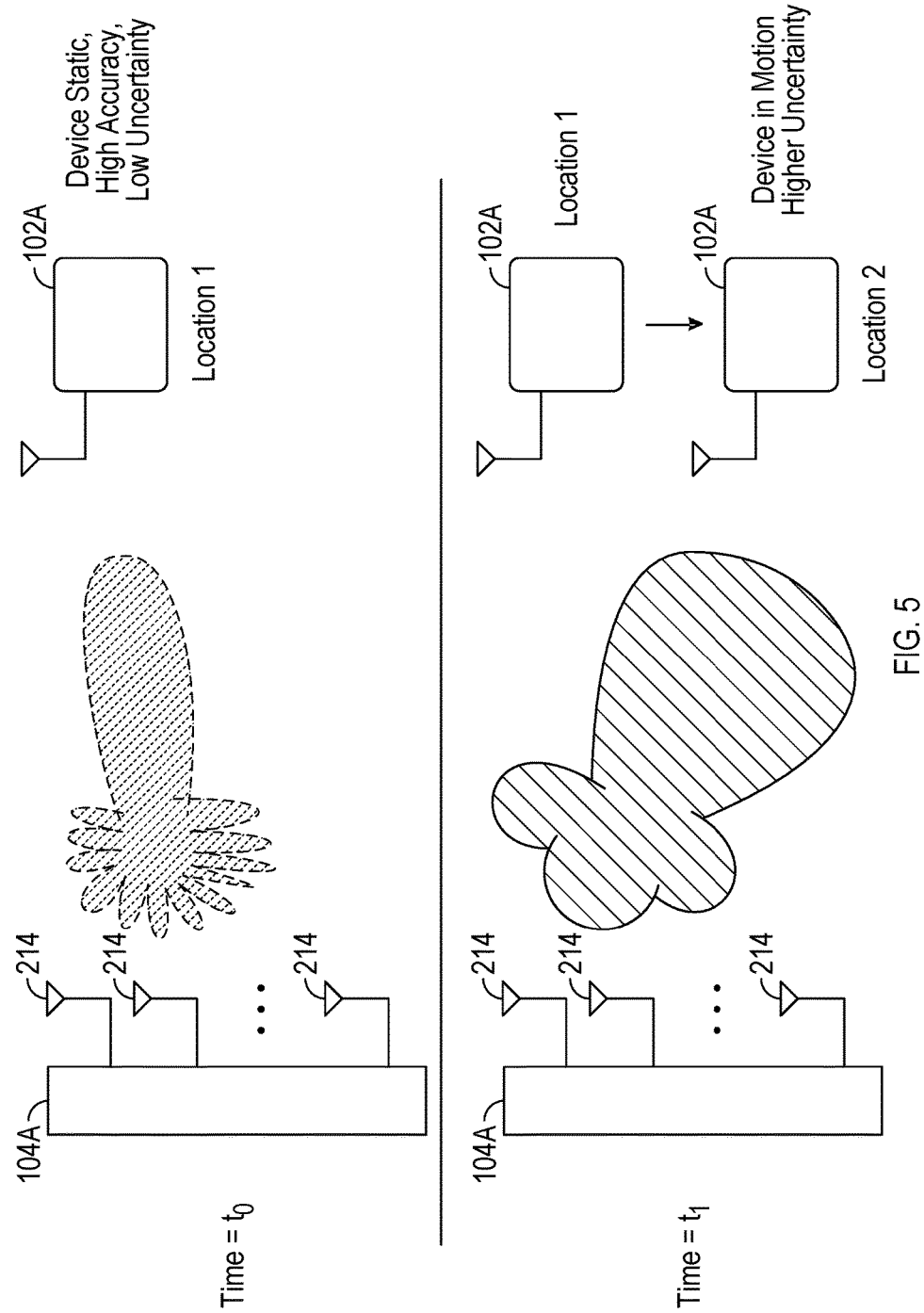
FIGS. 5 and 6 illustrate examples of adapting beamforming based on device characteristics in accordance with one or more implementations.

FIG. 5 illustrates an example of adapting the beamforming based on device characteristics in accordance with one or more implementations. At the time $t=t_0$, the base station 102A is static (e.g. not moving) and the properties (e.g., location, movement, orientation) may be determined with high accuracy and low uncertainty. In such a case, the output beam of the user device 104A may be narrowly focused and directed at the base station 102A. At a time $t=t_1$, the base station 102A is in motion and the motion properties may be associated with higher uncertainty.

In FIG. 5, the base station 102A is at location 1 at $t=t_0$ and at location 2 at $t=t_1$. In addition to changing the direction of the output beam due to the movement of the base station 102A, the user device 104A may widen the output beam to cover more area and increase the probability of the output beam being received/detected by the base station 102A. For instance, in a case where the base station 102A is moving at a high velocity with high uncertainty and/or through environments with rapidly changing interference, the output beam may be widened to increase the probability of the output beam being received/detected by the base station 102A. In some cases, modulation and coding rate may also be adjusted to facilitate successful reception of the output beam by the base station 102A. For instance, the modulation scheme associated with the output beam may be changed from a 1024 quadrature amplitude modulation (QAM) scheme to a quadrature phase-shift keying (QPSK) scheme to facilitate successful reception/detection of the output beam by the base station 102A.

Figure 6:
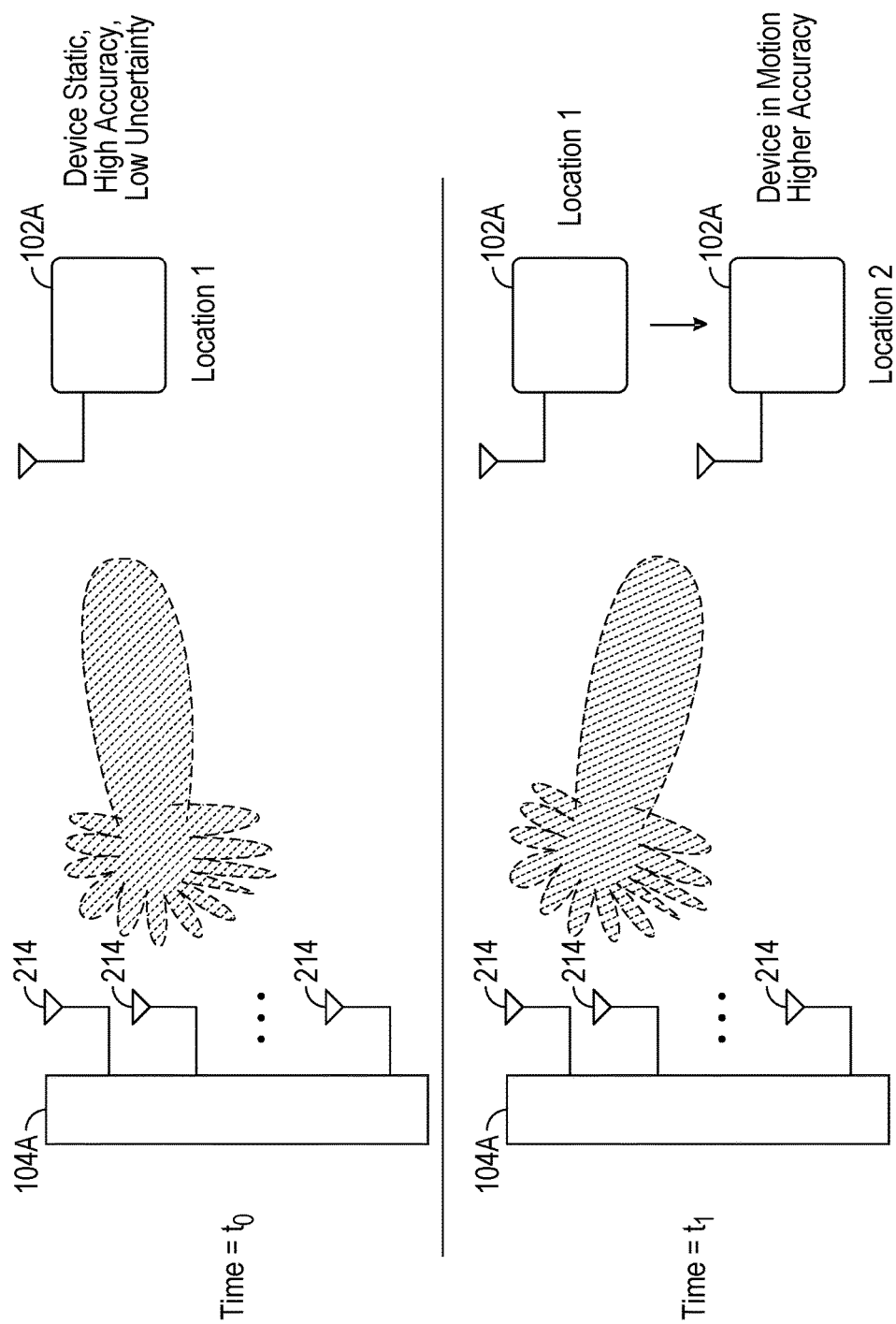

FIG. 6 illustrates another example of adapting the beamforming based on device characteristics in accordance with one or more implementations. In a case with accurate motion (e.g., location, velocity, orientation) prediction (e.g., low uncertainty), the user device 104A may direct the output beam to the base station 102A without widening the output beam and/or without changing the modulation and/or coding rate when the base station 102A moves and/or the user device 104A moves. For example, with regard to two satellite base stations in orbit connected by a wireless backhaul, the movement of the satellites 108A-B may be fairly constant, such that there is a high degree of certainty as to the expected locations of the satellites 108A-B at any given time.

The subject system may be used in a multi-user environment, such as to reuse frequencies for communication with different users. For example, multiple user devices may report their location and/or movement information to a base station, and the base station may calculate weights for each of the user devices based on the movement of the user devices and/or the movement of the base station (if any). The weights may be calculated such that the transmit and/or receive beams generated by the base station for each user device steers nulls in the direction of the other user devices, thereby allowing the same frequency to be used concurrently for transmissions to multiple devices.

Figure 7:
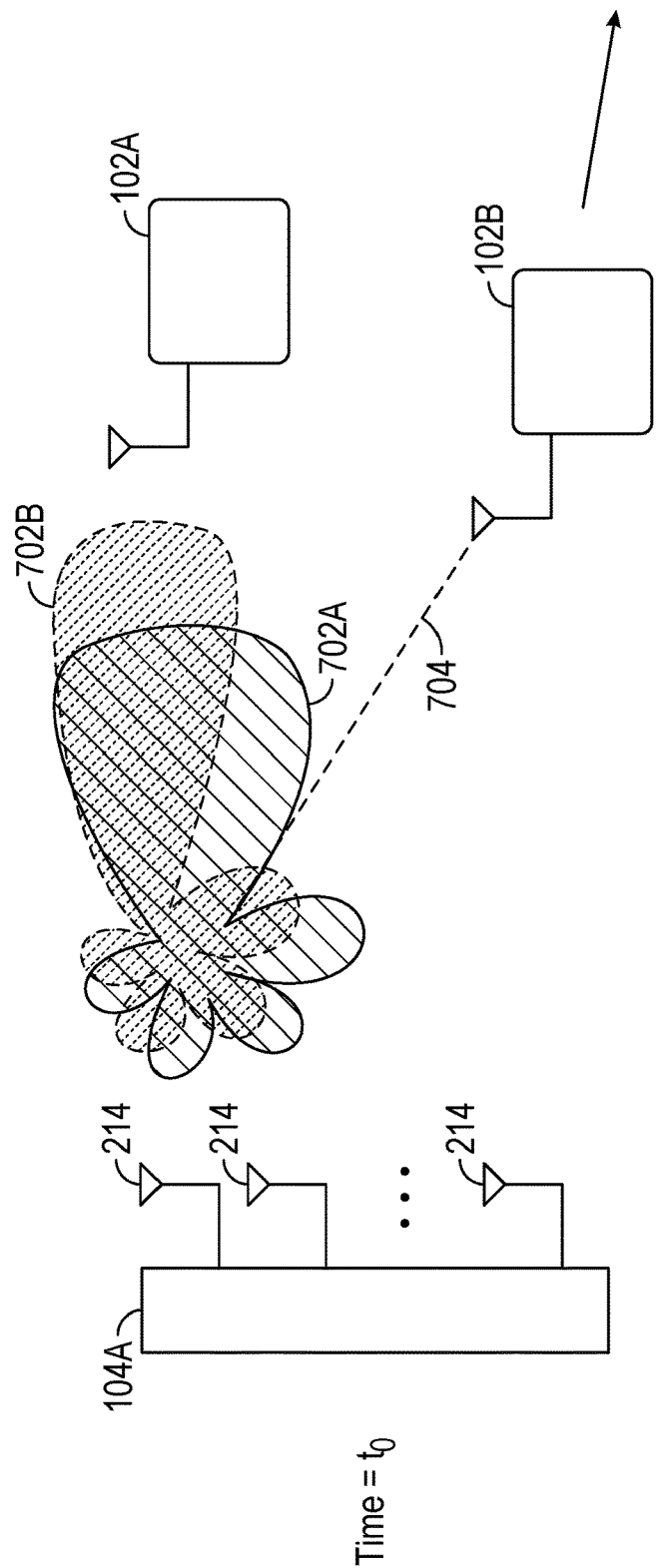
FIG. 7 illustrates an example of beamforming in multi-user multi-input multiple-output (MIMO) in accordance with one or more implementations.

FIG. 7 illustrates an example of beamforming in multi-user multi-input multiple-output (MIMO) in accordance with one or more implementations. When the base stations 102A-B are static, the user device 104A may generate an output beam 702A with a main lobe directed to the base station 102A. The output beam 702A may be formed to direct a null to the base station 102B, as shown by the dotted line 704. When the base station 102A is static and the base station 102B is moving, the user device 104A may generate an output beam 702B with a main lobe directed to the base station 102A. As shown in FIG. 7, in some cases, the output beam 702B may be narrower than the output beam 702A. The output beam 702B is thus associated with higher power in the main lobe as well as higher power in the side lobes. However, since the base station 102B is moving away from the user device 104A, projecting a null to the base station 102B and/or the effect of the higher powered side lobes may be less important (e.g., due to attenuation of the output beam 702B over distance). In some cases, the output beam 702B may be formed such that a null may be projected to a predicted location and predicted orientation of the base station 102B, such as based on measured or known movement information.

Figure 8:
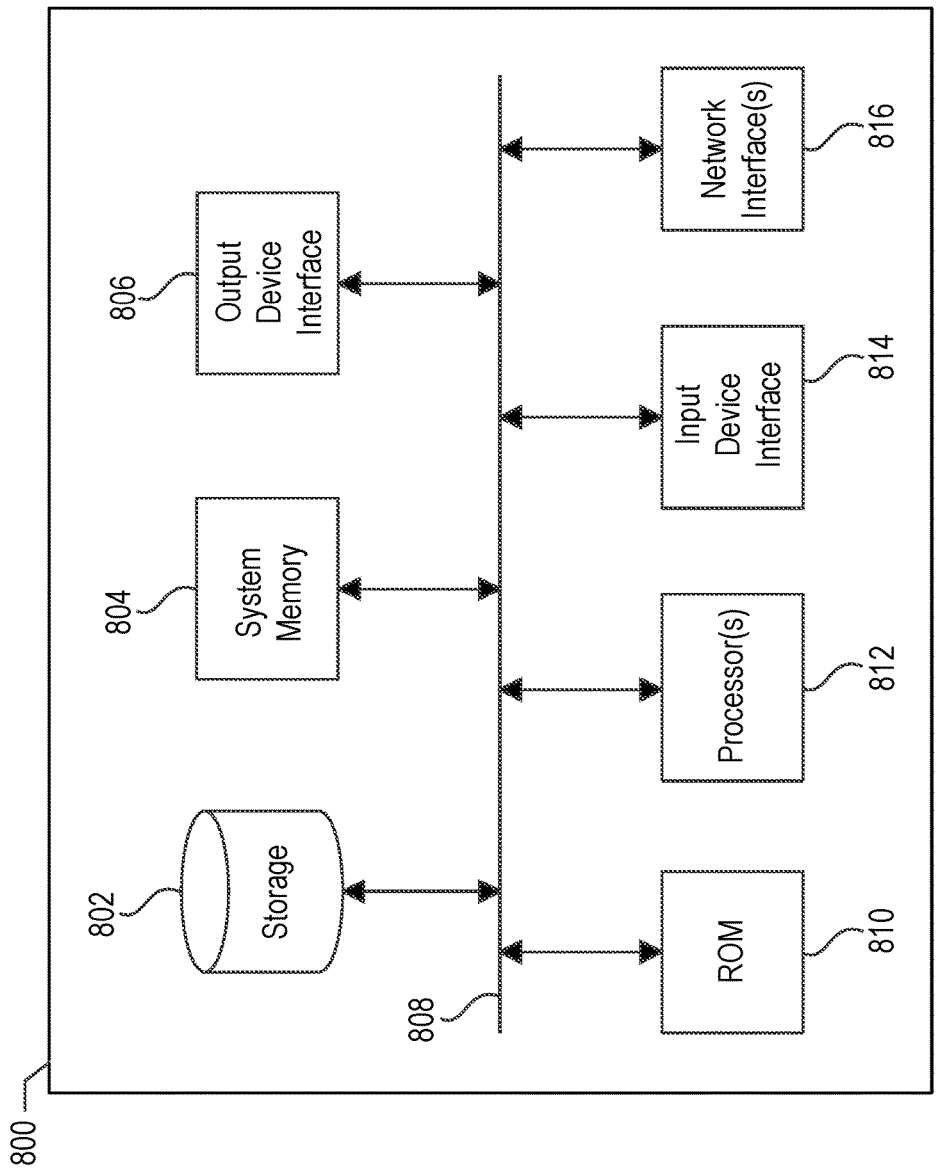
FIG. 8 conceptually illustrates an electronic system with which one or more implementations of the subject technology may be implemented.

FIG. 8 conceptually illustrates an electronic system 800 with which one or more implementations of the subject technology may be implemented. The electronic system 800, for example, can be a wireless backhaul device, a user equipment, a computer, a server, a switch, a router, a base station (e.g., the base stations 102A-E), a user device (e.g., the user devices 104A-C), a phone, a femtocell, a macrocell, a picocell, a small cell, or generally any electronic device that transmits wireless signals. Such an electronic system includes various types of computer readable media and interfaces for various other types of computer readable media. The electronic system 800 includes a bus 808, one or more processing unit(s) 812, a system memory 804 (and/or buffer), a read-only memory (ROM) 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to a network (not shown) and/or to one or more devices through the one or more network interface(s) 816, such as one or more wireless network interfaces (e.g. mmWave). In this manner, the electronic system 800 can be a part of a network of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
at least one processor configured to:
    establish communication with a first base station via at least one first beam;
    monitor motion of the device;
    determine that the device is approaching a second base station based at least in part on the monitored motion of the device;
    form at least one second beam in a direction of the second base station responsive to determining that the device is approaching the second base station while the communication is established with the first base station via the at least one first beam, the at least one second beam being initially formed with a null projected in a direction of the first base station;
    establish communication with the second base station via the at least one second beam concurrently with the communication with the first base station via the at least one first beam, the at least one second beam being separate from the at least one first beam; and
    terminate the at least one first beam with the first base station upon establishing communication with the second base station via the at least one second beam.

2. The device of claim 1, wherein the at least one processor is further configured to:
    initially form a wide beam for the at least one second beam in the direction of the second base station; and
    form a narrow beam for the at least one second beam in the direction of the second base station after communication with the second base station has been established.

3. The device of claim 2, wherein the at least one processor is configured to initially form the wide beam with the null projected in the direction of the first base station.

4. The device of claim 2, wherein the wide beam is associated with a different modulation scheme than the narrow beam.

5. The device of claim 1, wherein the at least one processor is further configured to:
    request, from the first base station, channel information for the second base station upon determining that the device is approaching the second base station;
    receive the channel information for the second base station from the first base station; and
    establish communication with the second base station via the at least one second beam based at least in part on the received channel information.

6. The device of claim 1, wherein the at least one processor is further configured to adjust the at least one second beam based at least on movement of at least one of the device or the second base station.

7. The device of claim 1, wherein the at least one processor is further configured to:
    determine, at a first time instance, an expected value of a motion parameter associated with the device at a second time instance subsequent to the first time instance based at least on the monitored motion; and
    adjust the at least one second beam based at least on the expected value of the motion parameter.

8. The device of claim 7, wherein the at least one processor is configured to adjust the at least one second beam further based on an uncertainty associated with the expected value of the motion parameter.

9. A computer program product comprising instructions stored in a non-transitory computer-readable storage medium, the instructions comprising:
    instructions to establish communication with a first base station via at least one first beam;
    instructions to monitor movement of a device;
    instructions to determine that a second base station is approaching the device based at least in part on the monitored movement of the device;
    instructions to form a wide beam for at least one second beam in a direction of the second base station, the wide beam being initially formed with at least one null projected in a direction of the first base station;
    instructions to establish communication with the second base station via the wide beam for the at least one second beam concurrently with the communication with the first base station via the at least one first beam; and
    instructions to narrow the at least one second beam in the direction of the second base station after communication with the second base station has been established.

10. The computer program product of claim 9, wherein the wide beam utilizes a different modulation scheme than the narrowed at least one second beam.

11. The computer program product of claim 9, wherein the instructions further comprise:
    instructions to receive channel information for the second base station from the first base station; and
    instructions to establish communication with the second base station via the at least one second beam based at least in part on the received channel information.

12. The computer program product of claim 9, wherein the instructions further comprise:
    instructions to determine, at a first time instance, an expected value of a motion parameter associated with the second base station at a second time instance subsequent to the first time instance based at least on the monitored movement; and instructions to adjust the at least one second beam based at least on the expected value of the motion parameter prior to the second time instance.

13. The computer program product of claim 12, wherein the instructions to adjust the at least one second beam based at least on the expected value of the motion parameter comprises instructions to adjust the at least one second beam based at least on the expected value of the motion parameter and an uncertainty associated with the expected value of the motion parameter.

14. A method comprising:

establishing, by a device, communication with a first base station via at least one first beam;

monitoring motion of the device;

determining that the device is approaching a second base station based at least in part on the monitored motion of the device;

forming at least one second beam in a direction of the second base station responsive to determining that the device is approaching the second base station while the communication is established with the first base station via the at least one first beam, the at least one second beam being initially formed with at least one null projected in a direction of the first base station;

establishing communication with the second base station via the at least one second beam concurrently with communicating with the first base station via the at least one first beam; and terminating the at least one first beam with the first base station upon establishing communication with the second base station via the at least one second beam.

15. The method of claim 14, further comprising:

initially forming a wide beam for the at least one second beam in the direction of the second base station; and forming a narrow beam for the at least one second beam in the direction of the second base station after communication with the second base station has been established.

16. The method of claim 15, wherein the wide beam is associated with a different modulation scheme than the narrow beam or the wide beam is formed with the at least one null projected in the direction of the first base station.

17. The method of claim 14, further comprising:

requesting, from the first base station, channel information for the second base station upon determining that the device is approaching the second base station;

receiving the channel information for the second base station from the first base station; and establishing communication with the second base station via the at least one second beam based at least in part on the received channel information.

18. The method of claim 14, further comprising:

adjusting the at least one second beam based at least on movement of at least one of the device or the second base station.

19. The method of claim 14, further comprising:

determining, at a first time instance, an expected value of a motion parameter associated with the device at a second time instance subsequent to the first time instance based at least on the monitored motion; and adjusting the at least one second beam based at least on the expected value of the motion parameter.

20. The method of claim 19, further comprising:

adjusting the at least one second beam further based on an uncertainty associated with the expected value of the motion parameter.

* * * * *